(12) United States Patent
Pantow et al.

(10) Patent No.: US 8,051,841 B2
(45) Date of Patent: Nov. 8, 2011

(54) CHARGING FLUID INTAKE MODULE AND INTERNAL COMBUSTION ENGINE

(75) Inventors: Eberhard Pantow, Moeglingen (DE); Georg Feldhaus, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 12/565,285

(22) Filed: Sep. 23, 2009

(65) Prior Publication Data
US 2010/0077996 A1 Apr. 1, 2010

Related U.S. Application Data

(63) Continuation of application No. PCT/EP2008/002077, filed on Mar. 14, 2008.

(30) Foreign Application Priority Data

Mar. 23, 2007 (DE) .................. 10 2007 014 704

(51) Int. Cl.
*F02B 47/08* (2006.01)
*F02B 47/00* (2006.01)
(52) U.S. Cl. .................................. 123/568.12
(58) Field of Classification Search ............. 123/568.12, 123/568.17, 568.11; 701/108; 60/605.1, 60/605.2
See application file for complete search history.

(56) References Cited

U.S. PATENT DOCUMENTS

| | | | |
|---|---|---|---|
| 5,269,143 A | 12/1993 | Cikanek et al. | |
| 5,740,770 A * | 4/1998 | Morota | 123/184.55 |
| 6,006,730 A | 12/1999 | Rutke et al. | |
| 6,662,772 B1 | 12/2003 | Murphy | |
| 2002/0053207 A1* | 5/2002 | Finger et al. | 60/605.2 |
| 2006/0060163 A1 | 3/2006 | Vanderveen et al. | |
| 2006/0060172 A1 | 3/2006 | Liu et al. | |
| 2006/0167613 A1* | 7/2006 | Barba et al. | 701/108 |
| 2006/0278377 A1* | 12/2006 | Martins et al. | 165/140 |
| 2007/0261400 A1* | 11/2007 | Digele et al. | 60/320 |
| 2007/0271910 A1* | 11/2007 | Chanfreau | 60/320 |

FOREIGN PATENT DOCUMENTS

| | | |
|---|---|---|
| DE | 693 00649 T2 | 4/1996 |
| DE | 198 53 455 A1 | 6/1999 |
| DE | 199 02 504 A1 | 8/2000 |
| DE | 10 2004 013 309 A1 | 10/2005 |
| DE | 10 2004 025 187 B3 | 11/2005 |
| DE | 10 2005 047 840 A1 | 6/2006 |
| EP | 0 874 142 A2 | 10/1998 |
| EP | 1 496 221 A3 | 1/2005 |
| EP | 1 533 512 A3 | 5/2005 |
| EP | 1 911 946 A3 | 4/2008 |
| JP | 62024050 U | 2/1987 |
| JP | 62171619 U | 10/1987 |
| JP | 2005155449 A | 6/2005 |
| WO | WO 99/14477 A1 | 3/1999 |

(Continued)

*Primary Examiner* — Mahmoud Gimie
(74) *Attorney, Agent, or Firm* — Muncy, Geissler, Olds & Lowe, PLLC

(57) ABSTRACT

A charging fluid suctions module is provided for an internal combustion engine, comprising a housing forming a flow path for a gaseous charging fluid, particularly air, a gas, and/or an air/gas mixture. Whereby, a heat exchanger is disposed in the housing for the gaseous charging fluid. In order to allow for an improved exhaust gas return the housing comprise an inlet channel for an exhaust gas, and the inlet channel flows into the flow path downstream of the heat exchanger for the gaseous charging fluid.

26 Claims, 4 Drawing Sheets

FOREIGN PATENT DOCUMENTS

| WO | WO 99/15773 A1 | 4/1999 |
| WO | WO 03/102396 A1 | 12/2003 |
| WO | WO 2005001272 A1 * | 1/2005 |
| WO | WO 2005071240 A1 * | 8/2005 |
| WO | WO 2006040053 A1 * | 4/2006 |
| WO | WO 2008/006604 A1 | 1/2008 |

* cited by examiner

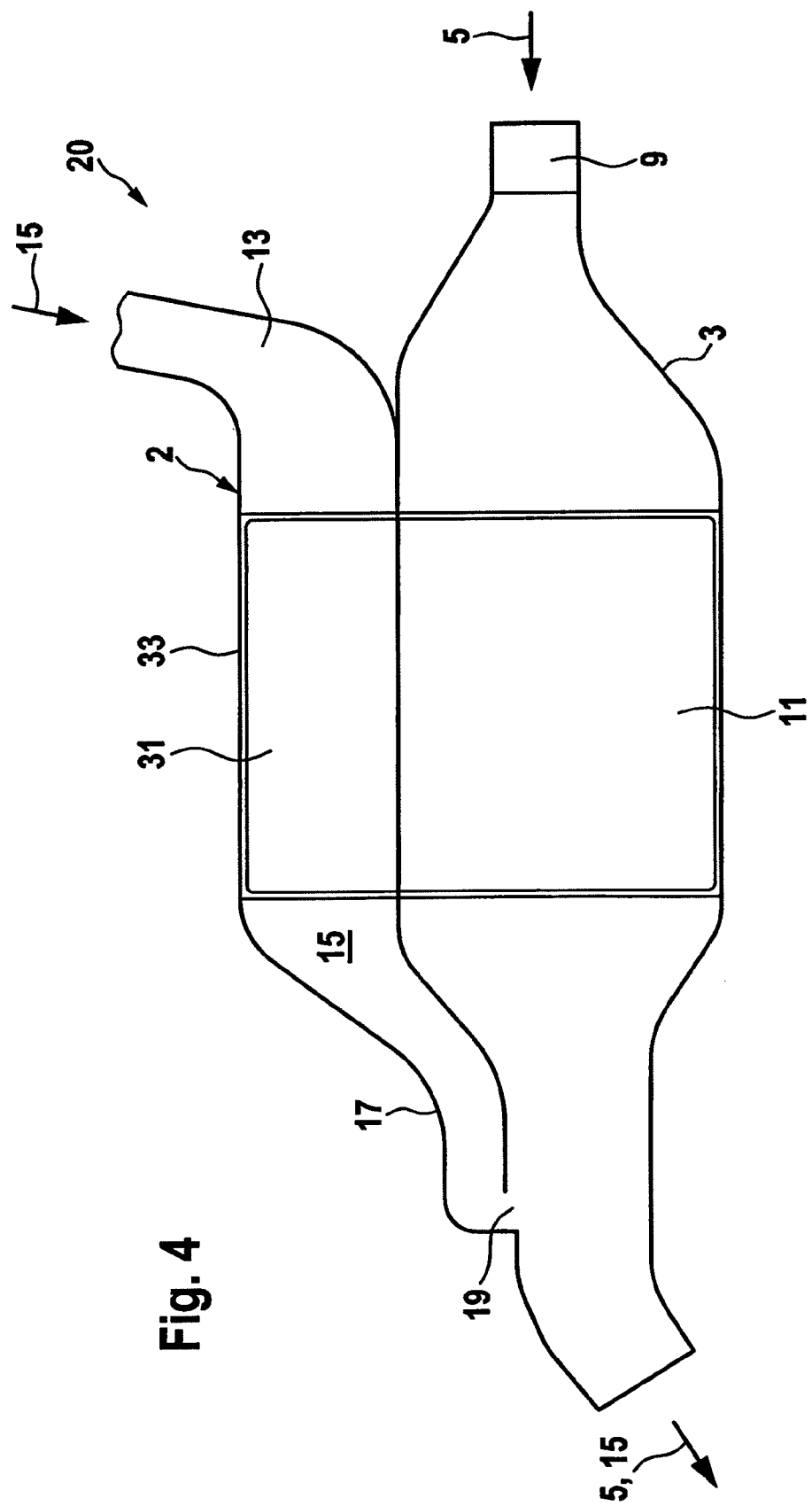

CHARGING FLUID INTAKE MODULE AND INTERNAL COMBUSTION ENGINE

This nonprovisional application is a continuation of International Application No. PCT/EP2008/002077, which was filed on Mar. 14, 2008, and which claims priority to German Patent Application No. 10 2007 014 704.1, which was filed in Germany on Mar. 23, 2007, and which are both herein incorporated by reference.

BACKGROUND OF THE INVENTION

1. Field of the Invention

The invention relates to a charging fluid intake module for an internal combustion engine with a housing that is configured to form a flow path for a gaseous charging fluid, wherein a heat exchanger for the gaseous charging fluid is arranged in the housing.

2. Description of the Background Art

A gaseous charging fluid intake module serves to supply the gaseous charging fluids needed for a combustion process in an internal combustion engine, in particular in the form of charge air or a charge air/gas mixture, which is preferably compressed.

In addition, concepts for charge air cooling serve, among other things, to reduce pollutants, in particular nitrogen oxides, in the exhaust gas. One such concept is described in U.S. Pat. No. 5,269,143, for example, in which a heat exchanger in the form of an intercooler designed as a separate component is provided for cooling the charge air.

In addition, an especially space-saving variant can be implemented by the means that—as in the aforementioned charging fluid intake module—a heat exchanger for the gaseous charging fluid, in particular charge air, is arranged in the intake plenum. Such a charging fluid intake module is described in DE 10 2004 025 187 B3, for example.

In another, further-reaching concept, exhaust gas recirculation is carried out, as described in, e.g., US 2006/0060172, for purposes including reducing fuel consumption and reducing pollutants in an internal combustion engine, such as a diesel engine or a gasoline engine. In this process, an exhaust gas is regularly cooled by means of a separate, external heat exchanger in the form of an exhaust gas recirculator cooler. In so doing, and possibly as a function of the engine operating point, a partial stream of the exhaust gas is taken from behind the engine, cooled in a heat exchanger in the form of an exhaust gas recirculation (EGR) cooler, and then mixed into the intake air. The quantity of exhaust gas that can be recirculated depends on the pressure drop between the exhaust gas side and the intake side and on the operating behavior of the engine.

Thus a distinction is drawn between high pressure exhaust gas recirculation and low pressure exhaust gas recirculation, for example. In high pressure exhaust gas recirculation, exhaust gas recirculation takes place between pipe sections that are under comparatively high pressure, for example through an exhaust gas recirculation line that exits on the engine exhaust side ahead of an exhaust driven turbine and enters on the engine intake side after a compressor. In contrast to this, low pressure exhaust gas recirculation generally takes place through an exhaust gas recirculation line between pipe sections that are under comparatively low pressure, for example through an exhaust gas recirculation line that exits on the engine exhaust side after an exhaust driven turbine and enters on the engine intake side ahead of a compressor. The performance or throughput of an exhaust gas recirculation system is generally determined by the volume (quantity) of recirculated exhaust gas that can be delivered, and hence by the available pressure difference. In the case of a low pressure exhaust gas recirculation system, a pressure difference—also called a scavenging drop—at the compressor is the critical factor, and can be increased if necessary for an exhaust gas quantity recirculated through an EGR cooler. In the case of a high pressure exhaust gas recirculation system, only the pressure difference between an engine exhaust side and an engine intake side is typically available for the exhaust gas flow rate.

Thus, for example, in the case of a high pressure exhaust gas recirculation system, the admixture of an exhaust gas into a compressed charge air normally takes place in the section between an intake pipe and an intercooler, as is the case in DE 10 2004 025 187 B3, for instance.

SUMMARY OF THE INVENTION

It is therefore an object of the present invention to improve the performance of an exhaust gas recirculation system, whereby a device is provided that permits a space-saving design and improved performance capability in an exhaust gas recirculation system.

With respect to the device, the object is attained by the invention through a charging fluid intake module in which, according to the invention, the housing has an intake passage for an exhaust gas and the intake passage discharges into the flow path downstream of the heat exchanger for the gaseous charging fluid.

The invention is based on the consideration that the position where the admixture of the exhaust gas takes place is an important factor for the scavenging drop in a charging fluid intake module, in which a heat exchanger for the gaseous charging fluid, in particular an intercooler, is located in the housing, in particular in an intake plenum, or a heat exchanger is integrated in an air intake pipe. In this context, it was noted that it can be disadvantageous to supply an exhaust gas ahead of the heat exchanger, since in such a case the scavenging drop is additionally reduced by the pressure drop on the charging fluid side, which to say on the air side, of the heat exchanger provided for the gaseous charging fluid, in particular for charge air. The invention has recognized that the exhaust gas quantity that can be recirculated is unnecessarily restricted in such a case, and that the advantage in reduced consumption can therefore be improved further.

In a first step, the invention starts with an especially compact unit that is located close to the engine and has short air paths, in which a heat exchanger for the gaseous charging fluid, in particular charge air or a charge air/gas mixture, is located in a housing, in particular in the intake plenum. As a result, a pressure loss in the charge air on the intake side is kept relatively small, which is advantageous. In accordance with the inventive finding that a pressure prevailing at the housing inlet, in particular in the intake plenum, for example in the intake pipe for charge air, has a comparatively great influence on the exhaust gas recirculation system, the concept of the invention provides an exhaust gas supply line downstream of the heat exchanger in the flow path of the gaseous charging fluid in order to achieve the greatest possible scavenging drop, which is to say the greatest possible pressure difference, between the exhaust and intake sides of an engine, and thus making available the largest possible pressure difference for an exhaust gas recirculation system. Otherwise, the scavenging drop would be reduced—as in the prior art— by the heat exchanger's pressure drop on the intake side for the gaseous charging fluid.

In addition, the problems of cooler clogging, thermal stress, and corrosion are reduced to a very great extent by the concept of the invention.

The invention also provides an exhaust gas recirculation system, in particular a high pressure exhaust gas recirculation system, with a charging fluid intake module according to the concept of the invention. Moreover, it has become evident that the use of the charging fluid intake module in a high pressure exhaust gas recirculation system is especially advantageous, since, as already explained above, components that increase the pressure difference are not always available for a high pressure exhaust gas recirculation system, with the available pressure difference instead being defined by a pressure on the engine exhaust side and a pressure on the engine intake side. The inventive concept takes advantage of this situation to the greatest possible extent by means of the charging fluid intake module explained above.

The invention also provides an internal combustion engine with a charging fluid intake module according to the inventive concept.

The charging fluid intake module can have an intake plenum for the gaseous charging fluid. Either in addition or alternatively, the charging fluid intake module preferably can have a number of individual intake ports associated with the cylinders of the internal combustion engine, through which the gaseous charging fluid can be supplied to the cylinders of the internal combustion engine. Such a module is also referred to as an intake manifold.

A throttle valve or another pressure-reducing element can be arranged ahead of the heat exchanger for the gaseous charging fluid intake module. In particular, a throttle valve can be arranged between an intake pipe and the intake plenum. The existing scavenging drop, which is determined by the pressure difference between the extraction point on the exhaust side and in the intake path, can advantageously be further increased by the throttle valve. This is especially advantageous for use in an internal combustion engine in the form of a diesel engine and, moreover, has also proven to have advantages for use in a gasoline engine. In particular, according to a development of the invention the throttle valve is located at the air intake, i.e. at the end of the intake pipe for the gaseous charging fluid and ahead of the intake plenum. In addition or alternatively, a throttle valve or other pressure-reducing or pressure-regulating element can be integrated in the charging fluid intake module and can be arranged either before or after the heat exchanger.

A heat exchanger for the gaseous charging fluid or for the exhaust gas can be designed in a variety of forms—both in terms of construction and with regard to layout with coolants. An air/water heat exchanger has proven to be especially advantageous, for example. However, media other than water, for example suitable refrigerants, can also be used as the coolant. Thus, a heat exchanger can additionally have a design embodiment with flow passages—whether for the gaseous charging fluid/exhaust gas or the coolant—in a wide variety of shapes as needed, for example as flat or angular tubular flow channels, or else in the form of flow channels assembled with disks. Moreover, in an advantageous arrangement the heat exchanger can have elements for improving flow or turbulence, or other heat-transfer-improving elements. The heat exchanger—for the gaseous charging fluid or the exhaust gas—can be embodied in an I-flow or U-flow design. It can be designed as one-stage or two-stage. In a two-stage design in particular, for example as a low-temperature stage and a high-temperature stage, the heat exchanger can have a bypass channel for bridging the heat exchanger and/or one particular stage of the same.

In general, the concept of the invention is suited for every advantageous arrangement, even from a design standpoint, for the opening of the exhaust gas intake passage downstream of the heat exchanger in the flow path of the gaseous charging fluid. Hence, according to an embodiment, for example, it is advantageous for the intake passage for the exhaust gas to discharge into the intake plenum. Moreover, it has been demonstrated according to the concept of the invention that it can be advantageous as a general rule to keep the volume of the intake air enriched with recirculated exhaust gas as small as possible. By this means, the combustion stability in the engine can advantageously suffer relatively little impairment even for rapid load changes. According to another especially advantageous development of the invention, an intake passage for the exhaust gas can discharge directly ahead of the individual intake ports in the flow path.

Moreover, it has been demonstrated that an especially small gas volume, among other things, results within the scope of the above-described embodiment when the discharge point is arranged at the latest possible location between the heat exchanger for the gaseous charging fluid, in particular an intercooler, and the intake valves at a cylinder. With regard to this aspect, it has also generally proven to be advantageous in particular for the intake passage for the exhaust gas to discharge onto an individual intake port in the flow path. By this means, the admixture of the exhaust gas is in practice as far downstream as possible.

According to another embodiment of the invention, the intake passage for the exhaust gas can have a number of openings associated with the individual intake ports, with each opening discharging in or at an individual intake port in the flow path. In other words, multiple intake passages can branch off from a common intake passage for the exhaust gas, for example, or else one intake passage can have openings that each discharge onto an individual intake port in the flow path. In an especially preferred manner, at least two openings with different sizes or shapes are provided. The sizes or shapes are preferably such that an exhaust gas can be delivered with uniform distribution over the number of cylinders. For example, a uniform apportionment of the exhaust gas to all cylinders of the internal combustion engine can be provided as a function of the position of the connection to the intake passage. In an especially preferred manner, the intake passage for the exhaust gas can be designed in the form of a manifold and/or can have multiple manifolds, which are preferably arranged in the discharge region.

Mixing elements, e.g. in the discharge region, can assist the admixture of the exhaust gas or configure it favorably with regard to pressure in accordance with the concept of the invention. For example, a nozzle, e.g., a valve nozzle, or mixing blade, or permeable elements arranged in the flow path is suitable.

According to an embodiment of the invention, a heat exchanger for the exhaust gas can be associated with the charging fluid intake module. The heat exchanger for the exhaust gas can be arranged as a component independent of the charging fluid intake module. With reference to the above-described development, it is also possible to achieve, above all, the uniform distribution of the exhaust gas among the cylinders, for example by means of openings of different sizes in the individual exhaust gas recirculation passages as a function of the relative position of the connection to the exhaust gas line from the intercooler, possibly also as a function of the aforementioned pressure drop in the intake passage, for example as a function of the pressure drop in the manifold.

According to another embodiment, a heat exchanger for the exhaust gas can be arranged in the housing, in particular in the intake passage for the exhaust gas. By this means, additional space can be saved as necessary for a heat exchanger in accordance with the first variant. Further, the heat exchanger for the exhaust gas can be arranged in the housing such that the flow path for the exhaust gas from the heat exchanger to the intake passage passes within the housing. This simplifies the work of making the connection.

In an embodiment, the heat exchanger for the gaseous charging fluid and a heat exchanger for the exhaust gas can be designed, for example, as a common heat exchanger module. By this means, the space requirement can be further reduced and, moreover, the heat exchanger as a common module for charge air and exhaust gas can be constructed in an especially advantageous and cost-effective manner.

The housing can be designed as a casting, in particular as an injection-molded part. Suitable materials are preferably plastic and/or aluminum or combinations thereof. A housing as an injection-molded part made of aluminum is particularly suitable.

A particular advantage of the use of aluminum as the material is the suitability of the housing for further integration of the heat exchanger or heat exchangers. According to an embodiment, one or more flow passages of the heat exchanger or heat exchangers can be designed, at least in part, as an integral part of the housing. However, this further integration can also be achieved in general with materials other than aluminum.

The housing can also be designed as a multi-part housing, in particular with a separate housing part for an intake plenum and a separate housing part for an individual intake port. Furthermore, additional or alternative configurations of the housing in accordance with requirements are also suitable. A one-piece housing has proven to be especially cost-effective.

The inventive concept has the advantage of improved delivery and distribution of cooled exhaust gas. As explained above, the recirculation can be implemented in an especially cost-effective manner, for example by forming a manifold, e.g. in the cover of the charging fluid intake module. The above-described further integration of a heat exchanger for the exhaust gas, in particular an EGR cooler, produces a compact unit including the intake plenum, possibly also with an intake pipe, the heat exchanger for the gaseous charging fluid, and the heat exchanger for the exhaust gas. This reduces the number of interfaces between the components and, moreover, reduces installation effort in the engine compartment. Moreover, considerable cost reductions can be achieved through common production of air paths and heat exchanger—individually or combined, as previously described.

Example embodiments of the invention are now described below with reference to the drawings. The drawings are not necessarily intended to show the example embodiments to scale; instead, they are drawn schematically and/or with slight distortion to serve the purposes of explanation. With regard to supplements to the teachings immediately discernable from the drawings, reference is made to the relevant prior art. It should be noted in this context that a variety of modifications and changes relating to the form and details of an embodiment can be made without departing from the general idea of the invention. The features of the invention disclosed in the description, the drawings, and the claims can be essential to development of the invention, both individually and in any desired combination. In addition, all combinations of at least two of the features disclosed in the description, the drawings, and the claims fall within the scope of the invention. The general idea of the invention is not restricted to the exact form or details of the embodiments shown and described below, nor is it limited to an object that would be restricted in comparison to the object claimed in the claims. Where measurement ranges are specified, values that lie within the stated limits are also to be disclosed as limit values and can be applied and claimed in any desired combination.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a cross-sectional view of the embodiment from FIG. 3.

DETAILED DESCRIPTION

Figure 1:
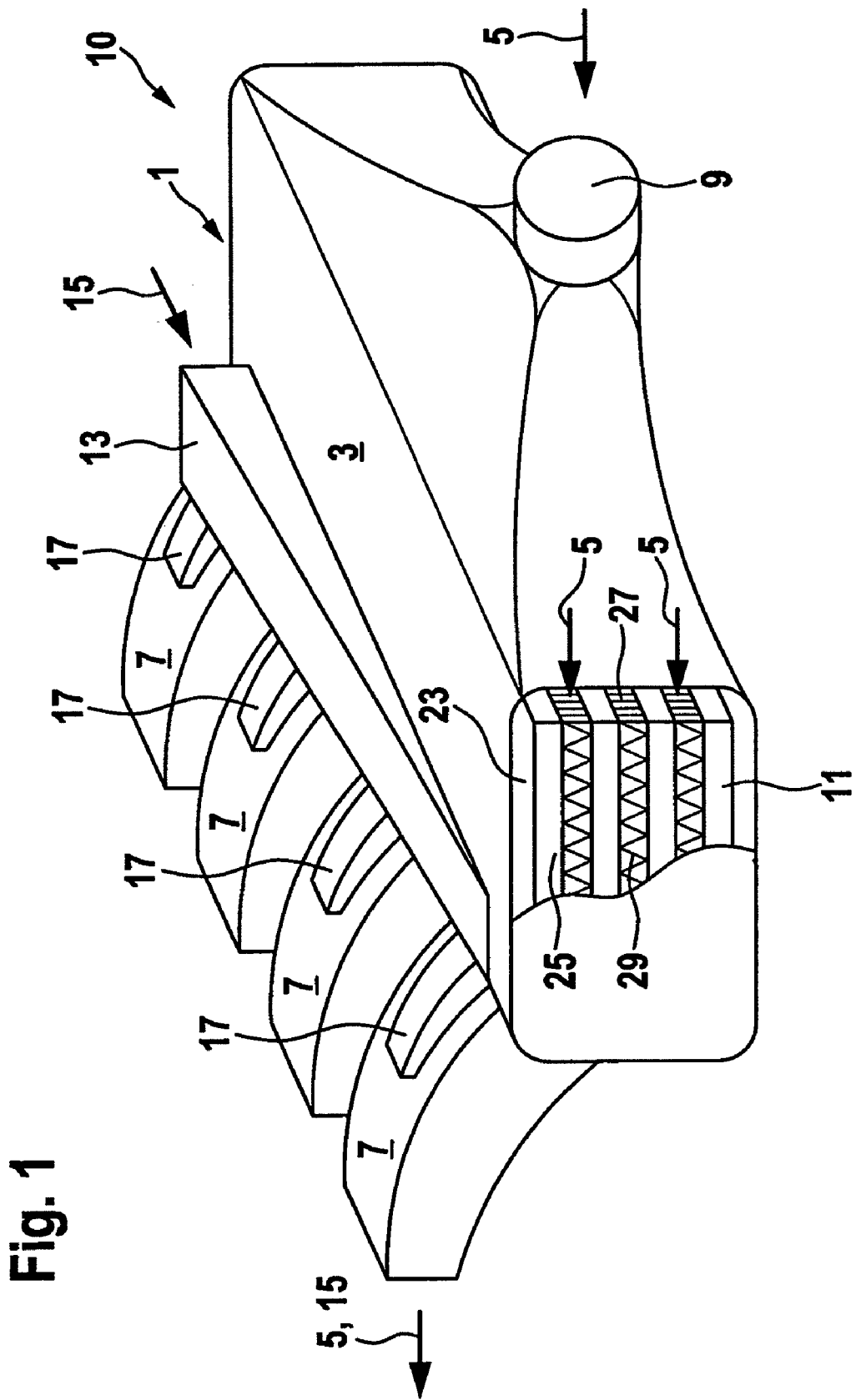
FIG. 1 illustrates an air intake module according to an embodiment of a charging fluid intake module, with integrated exhaust gas recirculation manifold and exhaust gas supply line that discharges into the flow path downstream of the heat exchanger for the charge air.

FIG. 1 shows a charging fluid intake module in the form of a charge air module or air intake module 10 for an internal combustion engine (not shown in detail) according to a first preferred embodiment of the invention. The air intake module 10 shown in cross-section in FIG. 2 has, as part of a housing 1, an intake plenum 3 for a charging fluid in the form of charge air 5, and a number of individual intake ports 7 associated with cylinders (not shown in detail) of the internal combustion engine, which are also known as intake manifolds. The charge air 5 is supplied to the cylinders of the internal combustion engine by means of the intake manifolds. The flow path of the charge air 5, indicated by arrows by way of example, in the housing 1 leads on the intake side from an intake fitting, which is not shown in detail, through a schematically shown throttle valve 9 into the intake plenum 3, through the schematically shown integrated heat exchanger in the form of an intercooler 11 into the individual intake ports 7 of the intake manifold, and finally to the cylinders of the internal combustion engine.

Figure 2:
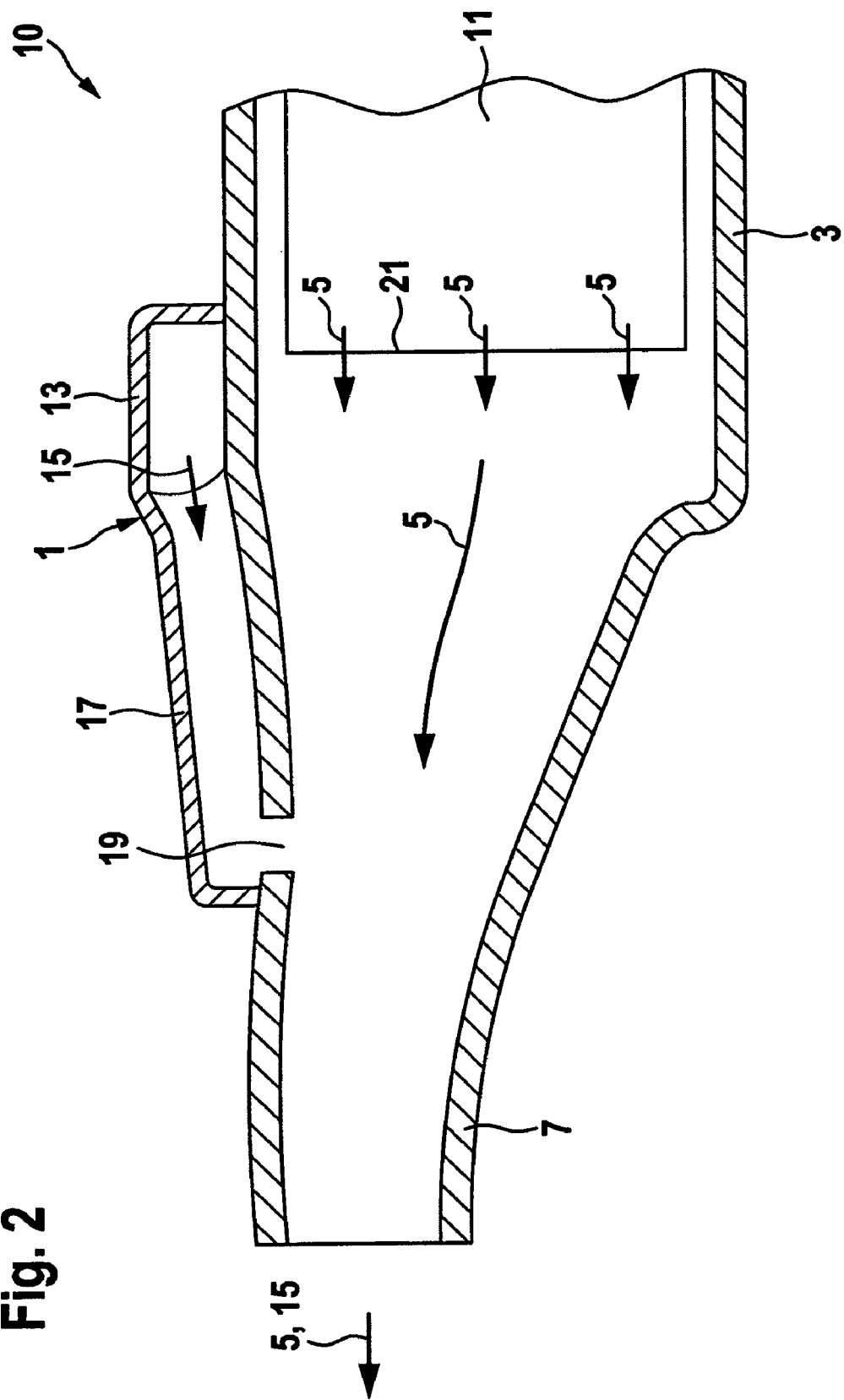
FIG. 2 is a cross-sectional view of the air intake module from FIG. 1.

In the present case, the air intake module 10 is provided for use in a high pressure exhaust gas recirculation system, but is also quite suitable for incorporation in a low pressure exhaust gas recirculation system. As mentioned at the outset, it has proven advantageous, especially in a high pressure exhaust gas recirculation system, to make the most of the available pressure difference, also called the scavenging drop, between a high-pressure region on the engine exhaust side and a high-pressure region on the engine intake side. In the embodiment shown in FIG. 1 and FIG. 2 this is accomplished by means of an exhaust gas recirculation system, which provides an intake passage 13 for the exhaust gas 15 within the housing 1, with the intake passage 13 discharging downstream of the heat exchanger 11 for the charge air in the flow path of the charge air represented with arrows by way of example. In the present case, the intake passage 13, located in the discharge region, has a manifold 17, which in turn has an opening 19 to the aforementioned flow path. FIG. 2 shows specifically that the opening 19 is located downstream of the outlet 21 of the heat exchanger 11.

In the embodiment shown in FIG. 1 and FIG. 2 in particular, the intake passage 13 for the exhaust gas 15 is extended by means of the manifold 17 such that the opening 19 is located at an individual intake port 7 of the intake manifold, so that in accordance with the present embodiment the admixture of the exhaust gas 15 to the charge air takes place relatively far downstream, namely does not take place until virtually directly in the individual intake ports 7 leading to the cylinders, which are not shown in detail.

The present embodiment takes into account that a pressure drop is present along the course of the intake passage 13. In order to permit the most uniform possible distribution of the exhaust gas to the cylinders while accounting for the pressure drop, the size of an opening 19 increases in the direction of the flow path of the exhaust gas 15 as the pressure drops, hence is smallest in the intake region of the manifold 17 located in the intake passage 13 and is largest at the opening 19 at the end, closest to the front in FIG. 1, of the manifold 17 that is also shown closest to the front. In addition, the shape and design of the openings can be usefully designed to achieve a good mixing of exhaust gas and air, in addition to the foregoing consideration. The embodiment in FIG. 1 and FIG. 2 not only provides an especially space-saving embodiment of a charge air intake module with an integrated intercooler, but also exploits the pressure difference available between the engine exhaust side and engine intake side in an especially advantageous manner almost completely through the arrangement of the discharge opening 19 relatively far downstream in the flow path of the charge air 15. In addition, the throttle valve 9 in the path of the charge air 5 between the intake pipe and intake plenum can be utilized to increase the pressure drop for the charge air 5, thus increasing the scavenging drop for the exhaust gas 15.

The heat exchanger 11 in the form of the intercooler is shown here symbolically and by way of example in FIG. 1 and FIG. 2, and can in general be implemented in a wide variety of shapes as a function of the area of application. To exchange heat between the charge air 5 and a coolant fluid (not shown in detail), in the form of a water-based coolant in the present case, the heat exchanger has a block that is designed for mutually separate, heat-exchanging passage of the charge air 5 and the coolant. The block has a housing 23 with a chamber 25 through which the coolant can flow, and has flow passages 27 located in the chamber 25 for the charge air. The mutually separate passage of the coolant and the charge air 5 in the chamber 25 and in the flow passages 27 results in an exchange of heat between the charge air 5 and the coolant, which may be advantageously improved by turbulence elements or guide elements 29. The intake and discharge of the charge air 5 to and from the heat exchanger 11 can take place as shown, in the direction of the flow path of the charge air 5. Variations can also provide for a lateral inflow to the heat exchanger, transverse to the flow direction shown, as needed.

Figure 3:
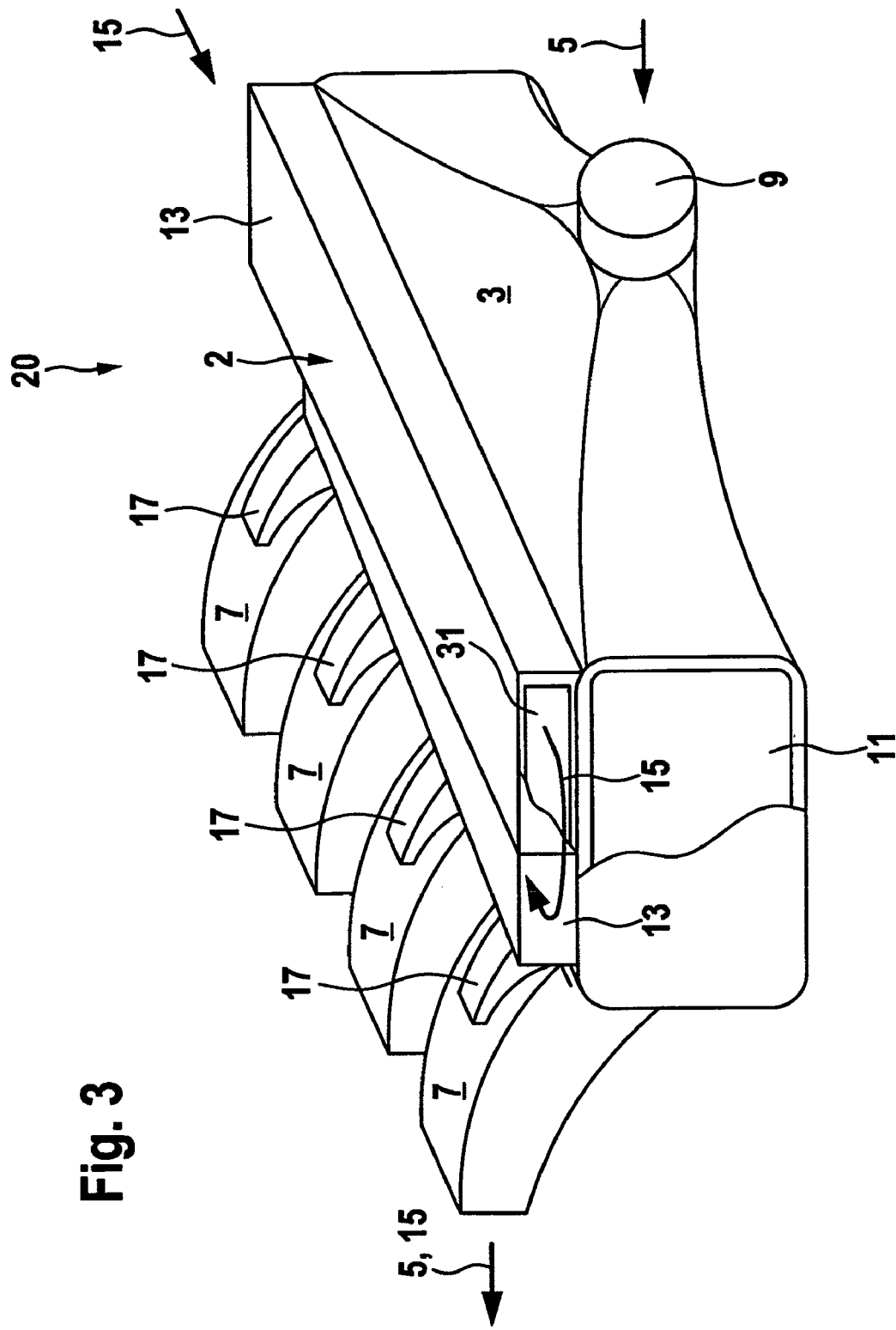
FIG. 3 illustrates a charging fluid intake module in the form of an air intake module with integrated exhaust gas recirculation cooler and exhaust gas recirculation manifold, wherein the supply line for the exhaust gas again discharges into the flow path downstream of the heat exchanger for the charge air.

FIG. 3 shows a perspective view, and FIG. 4 shows a corresponding cross-sectional view, of an especially preferred second embodiment of an air intake module 20, in which identical parts or parts with the same function as in FIG. 1 and FIG. 2 are labeled with the same reference symbols.

In contrast to the embodiment shown in FIG. 1 and FIG. 2, where exhaust gas cooling is external to and separate from the air intake module 10, the air intake module 20, which is otherwise identical in design and function, has an EGR cooler 31 that is also accommodated in the housing 2 and located in the intake passage 13 for the exhaust gas 15, and that forms a common heat exchanger module 33 together with the intercooler 11. To this end, the EGR cooler 31 and the intercooler 11 each form a cooler section of a common heat exchange module 33, wherein the cooler section of the EGR cooler 31 is located in the region of the intake passage 13 for the exhaust gas 15, while the cooler section of the intercooler 11 is located in the flow region of the charge air 5 in the intake plenum 3 of the air intake module 20.

The further integration of the EGR cooler achieved in the second embodiment thus results in an especially compact unit including the intake pipe (not shown), the intake plenum 3, the intercooler 11, and the EGR cooler 31. This considerably reduces the number of interfaces between the components and considerably eases installation work. Moreover, the common production of the intake module 20 together with the heat exchanger module 33 permits a considerable cost reduction in production.

In summary, the invention concerns a charging fluid intake module 10, 20 for an internal combustion engine with a housing 1, 2 that forms a flow path for a gaseous charging fluid 5, in particular an air, a gas, and/or an air/gas mixture; and has an intake plenum 3 for the gaseous charging fluid 5; wherein a heat exchanger 11 for the gaseous charging fluid 5 is arranged in the intake plenum 3. In order to permit improved exhaust gas recirculation, provision is made according to the inventive concept that the housing 1, 2 has an intake passage 13 for an exhaust gas 15, and the intake passage 13 discharges into the flow path downstream of the heat exchanger 11 for the gaseous charging fluid 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A charging fluid intake module for an internal combustion engine having cylinders comprising:
    a housing having an inlet for a gaseous charging fluid and an outlet for the gaseous charging fluid and configured to form a flow path for the gaseous charging fluid; and
    a heat exchanger arranged in the housing for the gaseous charging fluid;
    wherein the housing has an intake passage for an exhaust gas, the intake passage configured to introduce the exhaust gas into the housing at a location in the flow path downstream of the heat exchanger for the gaseous charging fluid.

2. The charging fluid intake module according to claim 1, further comprising an intake plenum for the gaseous charging fluid and a plurality of individual intake ports associated with the cylinders of the internal combustion engine configured to supply the gaseous charging fluid to the cylinders of the internal combustion engine.

3. The charging fluid intake module according to claim 1, wherein a throttle valve is arranged ahead of the heat exchanger for the gaseous charging fluid and/or is arranged between an intake pipe and an intake plenum and/or integrated in the housing.

4. The charging fluid intake module according to claim 2, wherein the intake passage for the exhaust gas discharges into the intake plenum.

5. The charging fluid intake module according to claim 2, wherein the intake passage for the exhaust gas discharges directly ahead of the individual intake ports in the flow path.

6. The charging fluid intake module according to claim 2, wherein the intake passage for the exhaust gas discharges directly at one of the plurality of individual intake ports in the flow path.

7. The charging fluid intake module according to claim 2, wherein the intake passage for the exhaust gas has a plurality of openings associated with the respective individual intake ports, and wherein each opening of the plurality of openings is configured to discharge at an individual intake port of the plurality of intake ports in the flow path.

8. The charging fluid intake module according to claim 7, wherein at least two of the plurality of openings of the intake passage have different sizes and/or shapes, or wherein the sizes and/or shapes are configured such that an exhaust gas is deliverable with a substantially uniform distribution over a plurality of cylinders.

9. The charging fluid intake module according to claim 1, wherein the intake passage for the exhaust gas has a manifold in a discharge region.

10. The charging fluid intake module according to claim 1, wherein a second heat exchanger for the exhaust gas is arranged in an intake passage for the exhaust gas.

11. The charging fluid intake module according to claim 1, wherein the heat exchanger for the gaseous charging fluid and a second heat exchanger for the exhaust gas are arranged in a common heat exchanger module.

12. The charging fluid intake module according to claim 1, wherein the housing is designed as a casting and/or as an injection-molded part, and wherein the housing is formed of plastic and/or aluminum.

13. The charging fluid intake module according to claim 1, wherein flow passages of the heat exchanger or heat exchangers are configured, at least in part, as an integral part of the housing.

14. The charging fluid intake module according to claim 1, wherein the housing is configured as a multi-part housing or is configured with a separate housing part for an intake plenum and a separate housing part for an individual intake port.

15. The charging fluid intake module according to claim 1, wherein the housing is configured as a single piece.

16. An exhaust gas recirculation system, in particular a high pressure exhaust gas recirculation system, comprising a charging fluid intake module according to claim 1.

17. Internal combustion engine having a charging fluid intake module according to claim 1.

18. The charging fluid intake module according to claim 1, wherein the gaseous charging fluid is air, a gas, or an air/gas mixture.

19. A charging fluid intake module for an internal combustion engine having cylinders comprising:

a housing configured to form a flow path for a gaseous charging fluid, the housing including an intake opening into a plenum and a plurality of discharge ports configured to provide the gaseous charging fluid to the cylinders; and a heat exchanger in the flow path in the housing;

wherein the housing has at least one exhaust gas opening into the flow path downstream of the heat exchanger for introducing an exhaust gas into the flow path.

20. The charging fluid intake module according to claim 19, wherein the housing includes an exhaust gas intake passage for carrying exhaust gas to the at least one exhaust gas opening.

21. The charging fluid intake module according to claim 20, wherein the at least one exhaust gas opening comprises a plurality of exhaust gas openings, each of the plurality of exhaust gas openings being associated with one of the plurality of discharge ports.

22. The charging fluid intake module according to claim 21, wherein the housing comprises a plurality of tubes leading from the plenum to the discharge ports and wherein the exhaust gas openings are located in the plurality of tubes.

23. The charging fluid intake module according to claim 22, wherein the exhaust gas intake passage is mounted over a junction between the plenum and the plurality of tubes.

24. A charging fluid intake module for an internal combustion engine having cylinders comprising:
a wall defining a plenum;
a heat exchanger in the plenum;
a charging fluid opening into said plenum on an upstream side of said heat exchanger for receiving a charging fluid into said plenum;
an exhaust gas passageway outside said plenum; and
at least one intake aperture in said wall on the downstream side of said heat exchanger in communication with said exhaust gas passageway and said plenum.

25. The charging fluid intake module according to claim 24, including a plurality of discharge tubes in fluid communication with said plenum on a downstream side of said heat exchanger for receiving the charging fluid from said heat exchanger.

26. The charging fluid intake module according to claim 25, wherein the at least one intake aperture comprises at least a first intake aperture and a second intake aperture, the first intake aperture being located in a first one of the plurality of discharge tubes and the second intake aperture being located in a second one of the plurality of discharge tubes.

* * * * *

UNITED STATES PATENT AND TRADEMARK OFFICE
CERTIFICATE OF CORRECTION

PATENT NO. : 8,051,841 B2
APPLICATION NO. : 12/565285
DATED : November 8, 2011
INVENTOR(S) : Pantow et al.

Page 1 of 1

It is certified that error appears in the above-identified patent and that said Letters Patent is hereby corrected as shown below:

On the Title Page

Change from:

Item (75) Inventors: Eberhard Pantow, Moeglingen (DE)

To:

Item (75) Inventors: Eberhard Pantow, Winnenden (DE)

Signed and Sealed this
Thirty-first Day of January, 2012

David J. Kappos
*Director of the United States Patent and Trademark Office*